United States Patent [19]

Zvěřina et al.

[11] Patent Number: 4,529,615
[45] Date of Patent: Jul. 16, 1985

[54] METHOD OF PRODUCING SELF-SUPPORTING CONSTRUCTIONAL ELEMENTS

[75] Inventors: Karel Zvěřina; Petr Kroupa, both of Prague, Czechoslovakia

[73] Assignee: Československa akademie věd, Prague, Czechoslovakia

[21] Appl. No.: 535,309

[22] Filed: Sep. 23, 1983

[30] Foreign Application Priority Data

Oct. 11, 1982 [CS] Czechoslovakia ............... 7221-82

[51] Int. Cl.³ ................................................ B05D 1/08
[52] U.S. Cl. ........................................ 427/34; 427/423
[58] Field of Search .......................... 427/34, 423, 422

[56] References Cited

U.S. PATENT DOCUMENTS

| | | | |
|---|---|---|---|
| 3,075,066 | 1/1963 | Yenni et al. | |
| 3,112,539 | 12/1963 | Barker | 427/34 |
| 3,427,698 | 11/1965 | Gezewicz | 427/34 |
| 3,429,962 | 2/1969 | Krystyniak | |
| 3,717,914 | 2/1973 | Baird et al. | 427/34 |
| 4,302,482 | 11/1981 | Heck | 427/34 |

OTHER PUBLICATIONS

Mash et al., *Structures and Properties of Plasma Cast Materials*, Metals Eng. Quarterly, Feb. 1964, pp. 18–26.

*Primary Examiner*—John Kittle
*Assistant Examiner*—James J. Seidleck
*Attorney, Agent, or Firm*—Jeffers, Irish & Hoffman

[57] ABSTRACT

The present invention relates to a method of producing self-supporting constructional elements by plasma-spraying onto a removable core.

Recently, there is in widespread use the method of producing constructional elements, especially of heat-resistant elements of rotary shape, by plasma-spraying of ceramic oxides onto a removable core. Existing problems in the art are caused by the slow removal of an intermediate layer, which separates the deposited constructional element material from the core, in suitable solvents, and the necessary neutralization of the produced constructional element.

These disadvantages are overcome by the method of the present invention characterized in that a core is preheated to a temperature in the range of from about 200° C. to about 650° C., a metallic or non-metallic intermediate layer having a thickness of about 0.1 to about 2 millimeters is deposited on the core by plasma-spraying. Afterwards, there are deposited by plasma-spraying the required layers on the intermediate layer; the required layers being of a heat-resistant ceramic oxide and forming the self-supporting constructional element. Thereafter, the core is cooled, the intermediate layer is separated from the material of the self-supporting constructional element, and the constructional element is removed from the core.

The method according to the present invention takes advantage of the thermal expansion of different materials and considerably speeds-up the production. It has special utility for the production of hollow bodies having a cylindrical or nearly cylindrical shape.

11 Claims, 4 Drawing Figures

METHOD OF PRODUCING SELF-SUPPORTING CONSTRUCTIONAL ELEMENTS

BRIEF DESCRIPTION OF THE DRAWINGS

The above-mentioned and other features and objects of the present invention, and the manner of attaining them, will become more apparent and the invention itself will be better understood by reference to the following description of an embodiment of the invention taken in conjunction with the accompanying drawings, wherein.

DETAILED DESCRIPTION

Figure 1:
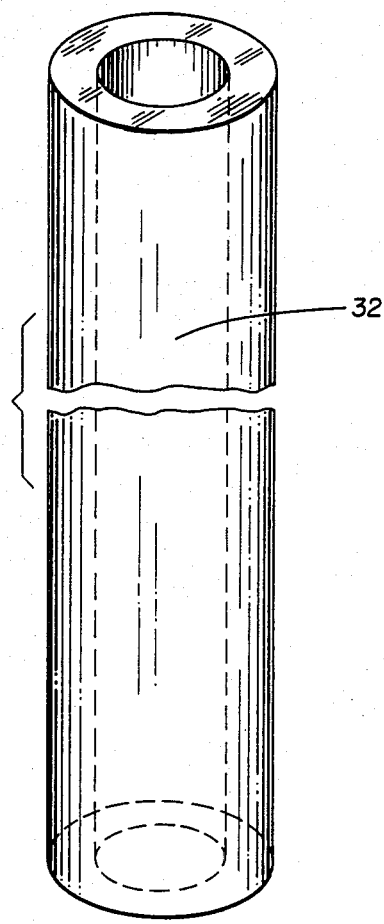
FIG. 1 is a broken-away view of an elongate self-supporting constructional element produced by the method of the present invention.
Figure 2:
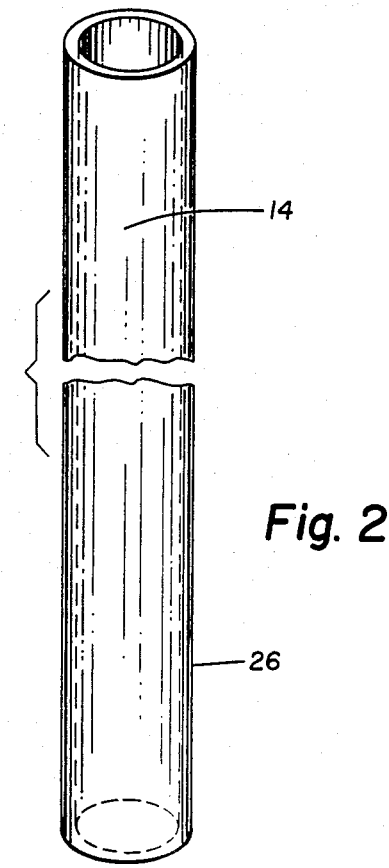
FIG. 2 is a broken-away view of a core utilized in the method.
Figure 3:
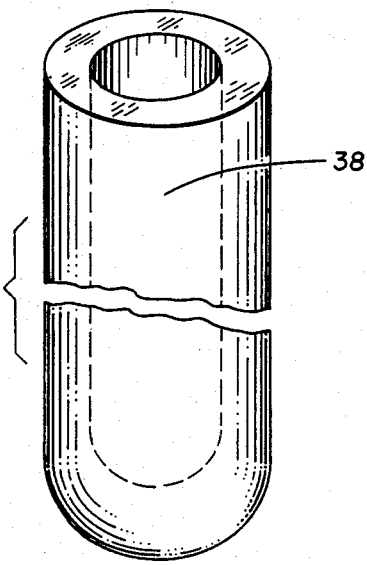
FIG. 3 is a broken-away view of a second elongate self-supporting constructional element produced by the method.
Figure 4:
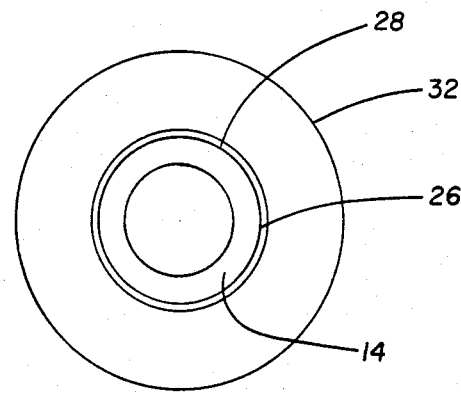
FIG. 4 is a transverse cross-section of the core having an intermediate layer and the deposited self-standing constructional element thereon.

Referring to the Figures, core 14 made of a suitable material is provided for spraying on its outer surface 26 an intermediate layer 28 made of metallic or non-metallic material. After application of layer 28, self-supporting constructional element 32 is applied to intermediate layer 28. Both layer 28 and element 32 are preferably applied by plasma spraying. As illustrated in FIG. 3, the method of the present invention also contemplates other constructional elements such as crucible 38.

In performing the method of the present invention, core 14 has intermediate layer 28 deposited thereon by plasma spraying. Intermediate layer 28 may be a non-metallic or metallic material, such as aluminum, zirconium, or potassium chloride. Moreover, core 14 can be preheated either before or after deposition of intermediate layer 28, and is preferably preheated to a temperature between about 200° C. to about 650° C. Preheating core 14 permits the method of the present invention to take advantage of the effects of thermal expansion in the subsequent removal of element 32.

Thereafter, self-supporting constructional element 32, or crucible 38, is deposited on intermediate layer 28 by plasma spraying. Constructional element 32, or crucible 38 is made of a ceramic oxide, such as zirconium silicate or aluminium oxide.

After constructional element 32, or crucible 38, has been applied on intermediate layer 28 to a desired thickness, core 14 is cooled and intermediate layer 28 is removed therefrom. Layer 28 can be removed by application of a solvent, such as acid, water, or by fusion. The method of removing intermediate layer 28 will depend upon the material of which it is made.

When core 14 has been cooled and intermediate layer 28 removed, constructional element 22, or crucible 38, is then removed from core 14.

EXAMPLE 1

A heat-resistant self-supporting constructional element of zirconium silicate was prepared by plasma spraying a zirconium silicate powder having a particle size of about 0.040 to about 0.065 millimeters. The constructional element having an inner diameter of about 100 millimeters, an outside diameter of about 110 millimeters, and a length of about 960 millimeters was made by plasma spraying on the core an intermediate layer having a thickness of about 0.6 millimeters. Afterwards, the core was preheated to a temperature of about 400° C., and the layer of zirconium silicate was deposited on the intermediate layer by plasma spraying. Immediately after finishing the plasma spraying operation, the core was severely cooled by water and separated from the self-supporting constructional element made of zirconium silicate.

EXAMPLE 2

A heat-resistant self-supporting constructional element having an inner diameter of about 55 millimeters was prepared from a material based on aluminium oxide deposited by plasma spraying on an intermediate layer of aluminium having a thickness of about 0.3 millimeters. After cooling the core, the intermediate layer was separated by treating it with a 50% water solution of hydrochloric acid while simultaneously cooling the reaction vessel. After removing the core and intermediate layer, the self-supporting constructional element was washed with running water until the pH reached about 6.0 to about 7.0, and then the constructional element was dried at a temperature of about 50° C. to about 80° C.

EXAMPLE 3

In the production of a heat-resistant crucible made of zirconium silicate, the intermediate layer was potassium chloride and was deposited by plasma spraying to a thickness of about 0.5 millimeters. After applying the zirconium silicate by plasma spraying, the intermediate layer was thereafter removed from the core by dissolving in water.

While this invention has been described as having a preferred embodiment, it will be understood that it is capable of further modifications. This application is therefore intended to cover any variations, uses, or adaptations of the invention following the general principles thereof, and including such departures from the present disclosure has come within known or customary practice in the art to which this invention pertains and fall within the limits of the appended claims.

What is claimed is:

1. A method of producing self-supporting constructional elements having generally cylindrical shapes by plasma spraying a ceramic oxide material on a nonexpendable removable core, comprising the steps of:
    depositing on the core an intermediate layer made of a material selected from the group consisting of aluminum, zirconium, and potassium chloride and having a thickness of about 0.1 to 2.0 millimeters,
    then heating the core to a temperature between about 200° C. to about 650° C.,
    depositing by plasma spraying on the intermediate layer of the heated core a ceramic oxide material as the self-supporting constructional element,
    thereafter cooling the core,
    then separating the intermediate layer from the self-supporting constructional element, and
    removing the self-supporting constructional element from the core.

2. The method of claim 1 wherein the intermediate layer is separated by a solvent.

3. The method of claim 1 wherein the intermediate layer is separated by fusion.

4. The method of claim 1 wherein the ceramic oxide material is selected from the group consisting of zirconium silicate and aluminum oxide.

5. A self-supporting constructional element produced in accordance with the method of claim 1.

6. A method of producing heat-resistant self-supporting constructional elements by plasma spraying on a removable core a ceramic oxide material, characterized in that:

there is first deposited on the core a metallic intermediate layer having a thickness of about 0.1 to about 2 millimeters, the intermediate layer is based on a material selected from the group consisting of aluminum and zirconium, and is deposited by plasma spraying the material on the core, thereafter the core is heated to a temperature between about 200° C. and about 650° C., then there is deposited on the intermediate layer by plasma spraying the ceramic oxide material as the self-supporting constructional element, after the spraying of the ceramic oxide material, the core is cooled and the intermediate layer separated from the self-supporting constructional element, and the self-supporting constructional element is thereafter removed from the core.

7. A method of producing heat-resistant self-supporting constructional elements by plasma spraying on a removable core a ceramic oxide material, characterized in that:

there is first deposited by plasma spraying on the core an intermediate layer of potassium chloride having a thickness of about 0.1 to about 2 millimeters, thereafter the core is heated to a temperature between about 200° C. and about 650° C., then there is deposited on the intermediate layer by plasma spraying the ceramic oxide material as the self-supporting constructional element, after the spraying of the ceramic oxide material, the core is cooled and the intermediate layer separated from the self-supporting constructional element, and the self-supporting constructional element is thereafter removed from the core.

8. A method of producing a self-supporting constructional element, comprising the steps of:

depositing on a core an intermediate layer, the intermediate layer is a material selected from the group consisting of aluminum, zirconium, and potassium chloride, heating the core and intermediate layer to a predetermined temperature, plasma-spraying on the heated intermediate layer a ceramic oxide material, cooling the core after plasma-spraying the ceramic oxide material, separating the intermediate layer from the cooled core, and then removing the ceramic oxide material as the self-supporting constructional element.

9. The method of claim 8 wherein the ceramic oxide material is selected from the group consisting of zirconium silicate and aluminum oxide.

10. The method of claim 9 wherein the intermediate layer is deposited on the core to a thickness between about 0.1 to about 2 millimeters.

11. The method of claim 10 wherein the intermediate layer is deposited by plasma-spraying.

* * * * *

UNITED STATES PATENT AND TRADEMARK OFFICE
CERTIFICATE OF CORRECTION

PATENT NO. : 4,529,615
DATED : July 16, 1985
INVENTOR(S) : Karel Zverina, Petr Kroupa It is certified that error appears in the above-identified patent and that said Letters Patent is hereby corrected as shown below:

Column 1, line 59, change "22" to --32--.

Column 2, line 3, change "0.6" to --0.5--.

Signed and Sealed this

Fourteenth Day of January 1986

[SEAL]

Attest:

Attesting Officer

DONALD J. QUIGG

Commissioner of Patents and Trademarks